Dec. 5, 1961 P. METZ 3,011,773
APPARATUS FOR ADDING MATERIALS IN GASEOUS SUSPENSION TO METALS
Filed Jan. 13, 1959 6 Sheets-Sheet 3
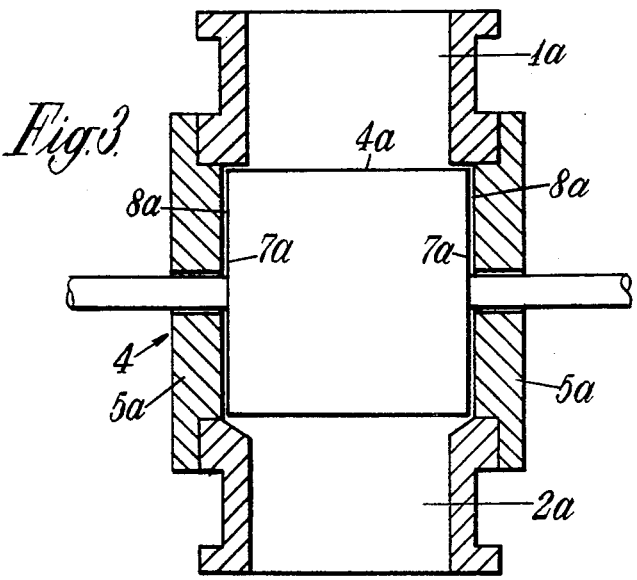
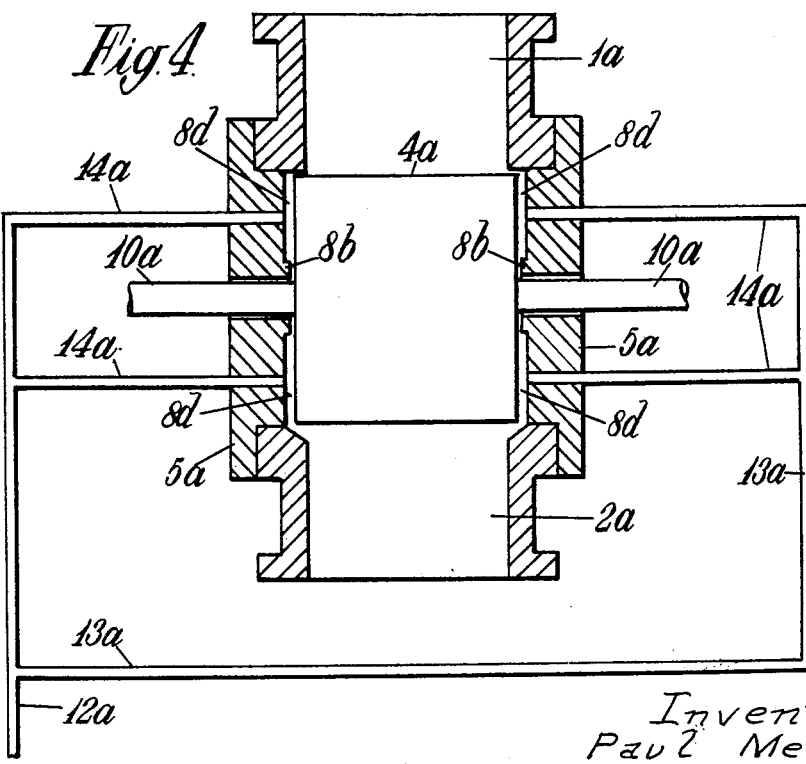
Inventor
Paul Metz
By
Watson Cole Grindle + Watson
Attys.

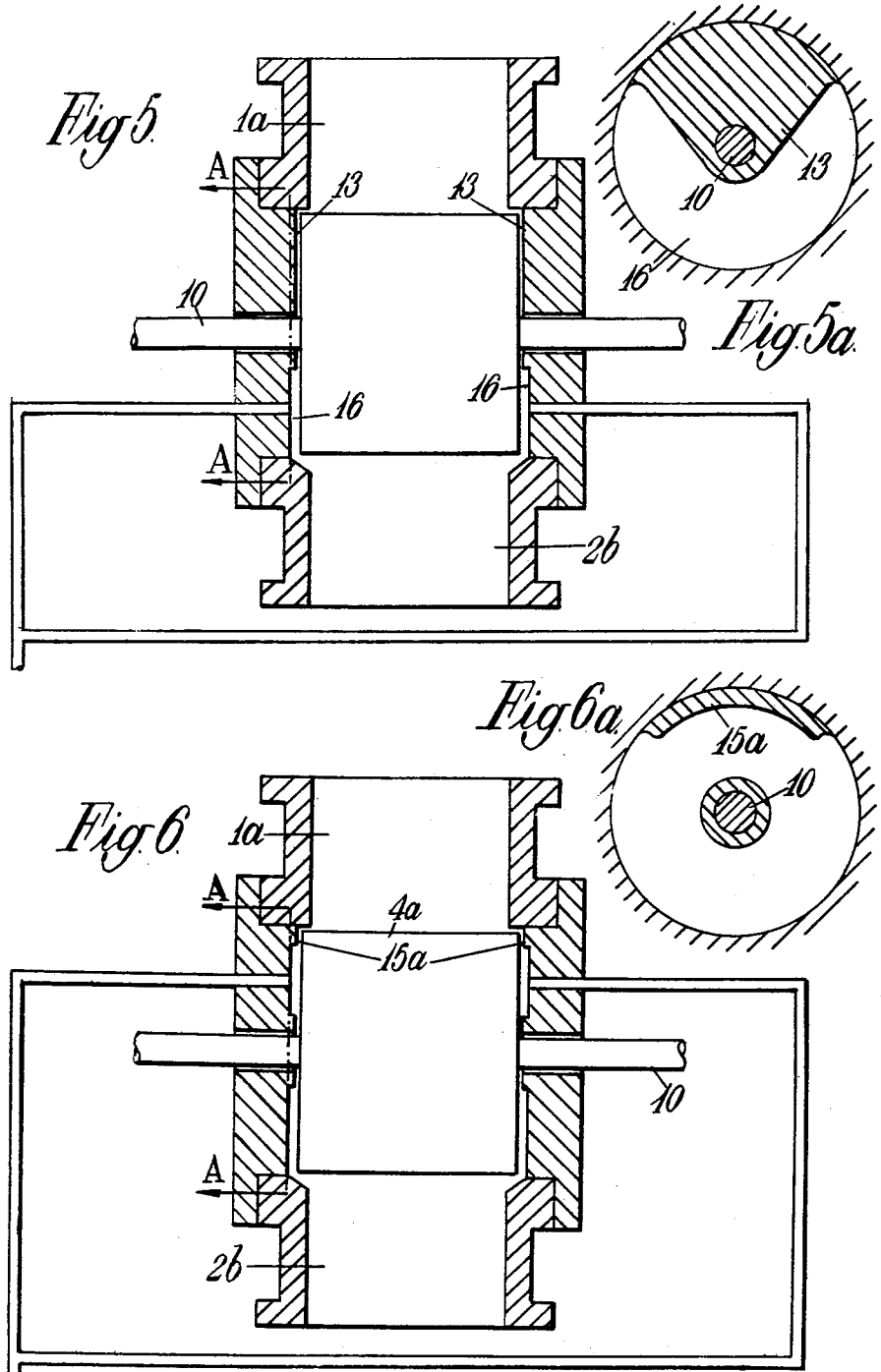

3,011,773
APPARATUS FOR ADDING MATERIALS IN
GASEOUS SUSPENSION TO METALS
Paul Metz, 52 Rue de z'Hotel de Ville Dudelange,
Dudelange, Grand Duchy of Luxembourg
Filed Jan. 13, 1959, Ser. No. 786,531
Claims priority, application Luxembourg Jan. 13, 1958
11 Claims. (Cl. 266—34)

The present invention relates to the passing of solid materials in suspension in a gaseous vehicle into or onto a melt. Many operations for treating molten metal include the addition of solid materials to carry out the necessary reactions. The blowing in of these materials in the form of powder or granules, hereinafter referred to simply as materials, in suspension in a gas or gaseous mixture is already known.

Yet, to be able to exploit this use of a gaseous vehicle in metallurgical operations satisfactorily, especially when gas under high pressure is used, some means of maintaining the rate of flow of material or of varying it at will is necessary.

The means known and used till now to achieve this aim have not generally proved economic or sufficiently promising for development.

The present invention includes the provision of a metering device for achieving a controllable rate of flow of material. In a preferred embodiment the metering is performed by a rotor consisting of a rotary cylindrical drum with its axis of rotation substantially perpendicular to an outlet from a storage container for the materials to be suspended and placed so that material coming from the container through this outlet is entrained by pockets in the co-axial surface of the rotating drum.

Another metering device according to the invention comprises a rotor which is an endless screw whose axis of rotation is substantially parallel to the outlet from the container.

To ensure an even rate of flow of the gaseous vehicle and of the material from the storage container it has been found advantageous to subject the material in the container and in the metering device to a pressure at least equal to that at the position where the material from the metering device passes into the main duct conveying the gaseous vehicle.

The rate of flow of material from the storage container to the metering device is often irregular due to material clinging to the walls of the container.

A preferred means of preventing this trouble has been found to be the fitting of the container partly or wholly with walls consisting of plates that can be caused to vibrate, or walls of perforated plate through which a gaseous vehicle can be blown inwards.

The rate of flow of the material entrained by the metering device is clearly a function of the speed of its rotor so that, in the metering device according to the invention, a constant speed of the rotor will correspond to a constant rate of flow of material. Therefore a control of the speed of the rotor will also control the rate of flow of material. For this, according to the invention, the metering device is driven by a motor whose speed can be controlled, or driven by one with a fixed speed through a variable speed gear. The invention also makes provision for the use of a revolution counter, which can be calibrated in units of weight or volume of the material, so that the rate of flow of material can be determined at once any moment by using a continuous differentiating device.

Also, another separate means for determining this rate of flow may be provided which consists of strain gauges on the mountings of the container which indicate the weight of material therein, and consequently, with the use of a continuous differentiating device, the rate at which the material leaves the container can be found whenever it is required. By correlating the information gained from this apparatus with the speed of rotation of the rotor of the metering device, the rate of flow of material can be easily and quickly controlled according to the state of advancement of the metallurgical operation, this latter being most often determined by the total quantity of gas blown into the molten metal.

The device according to the invention also provides for the relating speed of the rotor of the metering device to the rate of flow of the gaseous vehicle so as to be able to make a suspension at the desired density of solid material as to unit of volume of the gaseous vehicle.

Some non-limiting, exemplary embodiments of the invention are now described with reference to the accompanying drawings, in which:

FIGURES 3 to 8 show vertical sections of metering devices, FIGURES 5a and 6a being cross sections taken on lines A—A of FIGS. 5 and 6 respectively.

Figure 1:
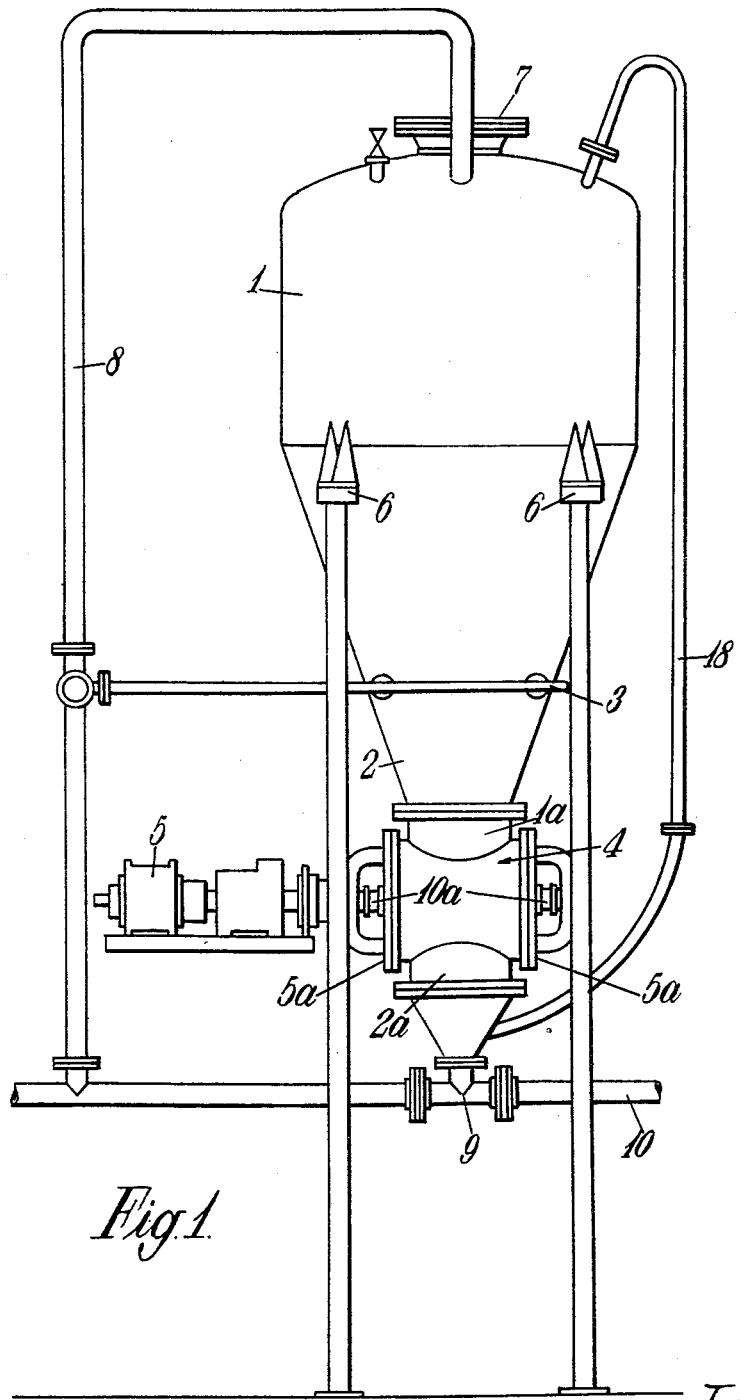
FIGURES 1 and 2 are elevations of an apparatus for suspending material in gaseous vehicle prior to use in a metallurgical operation.

In FIGURE 1, the container 1 for holding the materials is lined with perforated plates in its lower part 2, which are supplied with gas by means of the pipes 3. The drum being the rotor of the metering device 4, is driven by a variable speed motor 5. The container is furnished with stress gauges 6 and it is hermetically sealed by the cover or sliding hatch 7 and may be pressurised through the pipes 8. The materials may be passed into a main duct or pipe 10 at 9 and passed in suspension towards the apparatus where they are to be used.

However, in certain cases, it has been found that, despite the rate of flow of gaseous vehicle and material with this apparatus being constant when measured over comparatively long intervals of time, violent fluctuations in pressure in the main duct sometimes occur which may lead to molten metal being thrown out of the melt being blown. To prevent this happening it is usually sufficient, according to the invention to make the pressure inside the container 1 at least 0.1 kg./cm.$^2$, preferably 0.3 kg./cm.$^2$, above that at the point 9 where the material enters the gaseous vehicle in the main duct.

Figure 2:
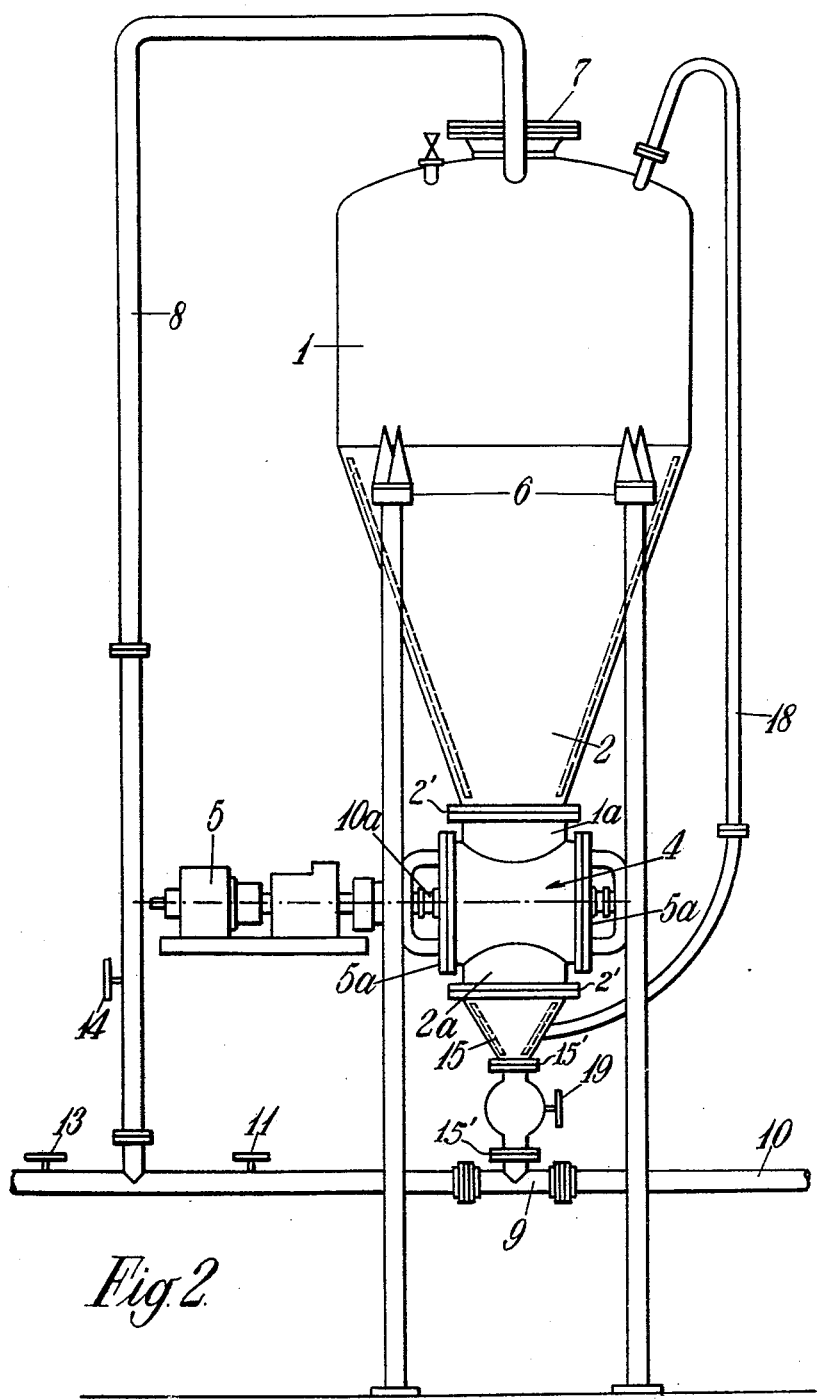

FIGURE 2 illustrates a means to maintain the pressure inside the container 1 above that at 9 in the duct 10 for this purpose. The rotor 4 of the metering device is driven by the motor 5. The container 1 for holding the material is closed hermetically by a cover or sliding hatch 7 and is pressurised through the pipe 8. The material to be placed in suspension is passed at 9 into the main duct 10 conveying the gaseous vehicle, and then passes in suspension to the apparatus where it is to be used.

To obtain the relatively high pressure in the container, the latter may be connected to the main duct 10 upstream from a throttle valve 11, which latter immediately upstream from 9, is capable of causing a variable pressure drop in the duct. In FIGURE 2 the pipe 8 is connected to the main duct 10 so that the flow of gaseous vehicle to the container 1 can be controlled either by a main valve 13, or a special valve 14, which is opened as soon as the valve 11 is opened and closed when the valve 11 is closed.

To make a comparative reduction in pressure at 9 where the materials enter the stream of gaseous vehicle, the duct 10 may be formed as a venturi designed to impart a pressure in its constricted portion at 9 at least 0.1 kg./cm.$^2$ lower than that in the junction of pipe 8 to the duct 10 when the device is in operation.

These modifications substantially reduce the fluctuations found to occur otherwise in the flow of the material and gaseous vehicle along the main duct.

If necessary, the following devices according to the invention can be used together or separately to reduce these fluctuations still further.

The connection 15 in FIGURE 2 joining the metering device to the main duct 10 may be provided with perforated plates 15' and 2' at metering device 4 and/or perforated tubes not shown; one or both of which may be supplied with a gaseous vehicle at a pressure greater than that in the container 1, for example through the pipe 18, so as to pass the gaseous vehicle into the material coming from the container.

To the same end, a valve 19, whose aperture can be made to vary with the speed of the rotor in the metering device, can be placed between the connection 15, or (if the connection 15 is not used), the metering device 4 and the main duct.

Also the material passing from the metering device in the connection 15 can be fluidised or aerated, for example by means of a wide meshed "sieve" incorporating tubes through the bores of which gaseous vehicle may be blown inwards.

It has also been found that a sudden shutting off of the supply of gaseous vehicle, as is often required in metallurgical operations, may cause jamming of the drum or prevent it metering the material satisfactorily.

To prevent this happening, it has been found effective, according to the invention, to place a constriction in the main duct 10 downstream from 9; the effective aperture of this constriction being equal to, or preferably less than the total aperture of the tube or tubes connecting the top of the container with the main duct 10. When the installation is used to supply a lance for the top blowing of a melt of metal, this constriction may be formed by the outlet tuyere of the lance, the effective aperture of this tuyere then being at least equal to the total aperture of the pipe or pipes connecting the container with the duct 10 upstream from the valve 11.

As in most cases the gaseous vehicle used is oxygen or an oxydizing gas or gaseous mixture, it would seem promising to construct the duct 10, the other pipes, and the container of a substance having a high resistance to oxygen, as for example, copper or stainless steel.

Moreover, if the materials used are abrasive or contain abrasive impurities, it would also seem advantageous to make the duct or ducts conveying the materials in suspension in the gaseous vehicle of, or to line them with, a substance resistant to abrasion, stainless steel having been found particularly suitable for this purpose.

Material may sometimes jam the rotor of the metering device or cause it to work irregularly by sticking in the pockets.

It has been found that this can be prevented by providing a means for passing gaseous vehicle through the pockets. To do this, the gaseous vehicle can be led through the shaft of the drum by a means which then leads it to holes or porous inserts in the bottoms of the pockets while they are in the discharging position, or continuously.

Alternatively, a pipe with many openings therein can be placed immediately beneath the drum in the connection between it and the main duct 10 so that gas can be blown upwards into the pockets in the discharging position.

In installations of the type described the metering devices incorporate a rotary drum with pockets in its co-axial surface mounted in a cylindrical casing having a supply aperture opposite the container and an outlet opposite the main duct into which the materials are to be introduced.

The two ends of the cylindrical casing around the rotary drum with pockets support the shaft of the drum. A clearance equivalent to a few tenths of a millimetre at each end of the drum may be left between the entire area of the radial ends of the drum and the adjacent faces of the casing. However, this arrangement has the disadvantage that particles of material may pass into the clearance mentioned, and, there being nothing to clear them out, may jam the drum.

According to the invention this can be prevented by having central bosses around the journals of the drum shaft projecting inwards from the inside surface of the casing ends so as to leave a clearance of a few tenths of millimetre; while the greater part of radial surfaces of the drum ends is separated from the casing ends opposite them (that is around the bosses), by a gap of at least 2 millimetres. The gaseous vehicle is led through one or more tubes into this latter gap at a pressure greater than that in the casing around the drum so as to prevent material from entering the space between the radial ends of the drum and the casing.

FIGURE 3 of the drawings represents a metering device 4 incorporating a drum. The material to be placed in suspension in the gaseous vehicle can pass downwards through the outlet 1a from the storage container to be entrained by the pockets on the co-axial surface of the drum and carried in outlet 2a towards the main duct conveying the gaseous vehicle. The drum 4 is mounted rotatably in the casing 5a whose ends are separated from the ends 7a of the drum by a clearance of a few tenths of a millimetre. If such a metering device is used in an installation according to the invention material passes into the space around the co-axial surface of the drum and into the clearance 8a, where since there is not sufficient means to remove it, it may cause the drum to be jammed.

FIGURE 4 shows another metering device in which means are provided to prevent the drum 4a being jammed. The inner sides of the casing 5a have bosses 8b around the shaft 10a of the drum 4a projecting so as to leave a clearance 8d equivalent to a few tenths of a millimetre between them and the radial faces of the drum. The clearance 8d of at least 2 mm. is left between the radial faces and portions of the casing ends around the bosses 8b. When the metering device is operated, gaseous vehicle can be passed through the duct 12a, branching into ducts 13a and 14a into the clearance 8d to prevent material from accumulating which might jam the drum.

In a further type of metering device according to the invention shown in FIGURES 5 and 5a, the portions of the casing ends not only include parts corresponding to the bosses of FIGURE 4, but extend towards the peripheries of the casing ends, preferably where the latter are nearest the outlet passage 1a leading from the storage container, as can be seen from FIGURE 5a.

According to another type of metering device embodying the invention shown in FIGURES 6 and 6a, the radial surfaces of the drum are separated from the adjacent faces of the casing by a gap of at least 2 mm. except where the casing ends have central bosses and arcuate portions 15a where the clearance is of the order of a few tenths of a millimetre. The arcuate portion is placed preferably nearest the outlet 1 leading from the storage container according to FIGURE 6a.

Figure 7:
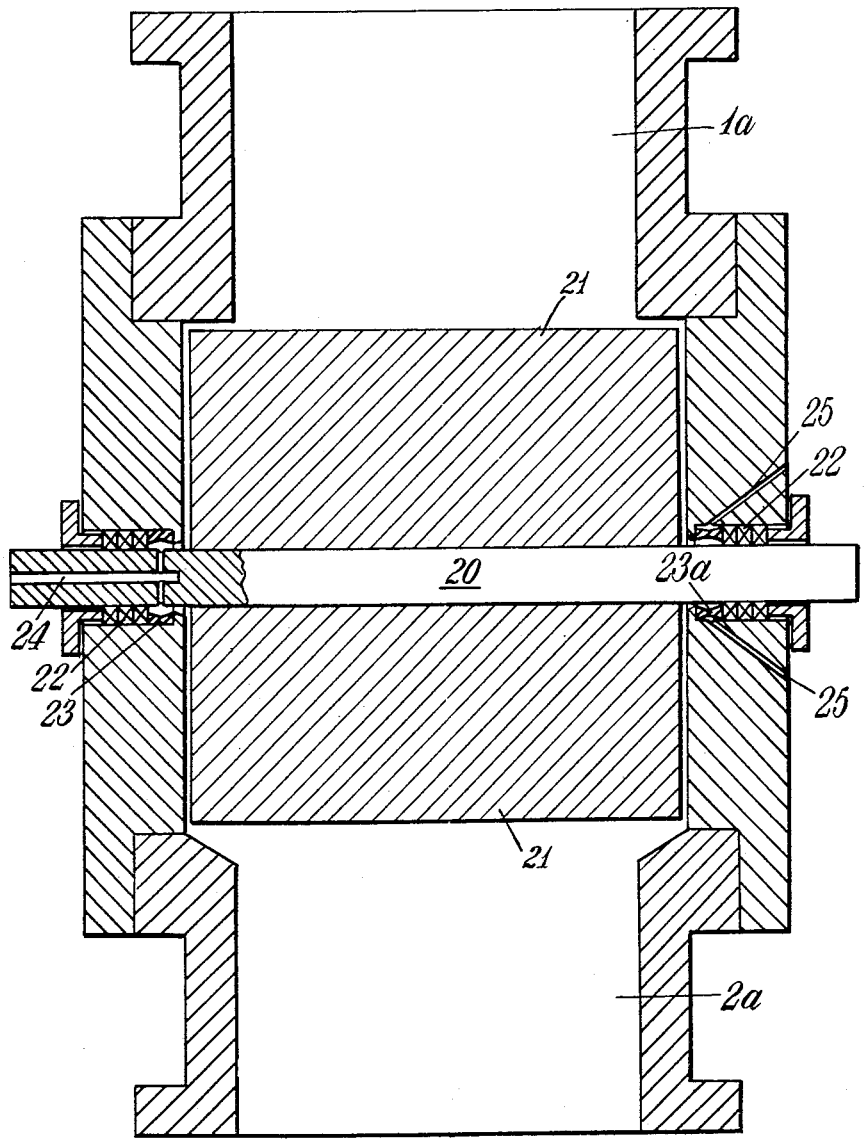

FIGURE 7 shows two devices according to the invention to protect the surfaces of the bearings 22 journalling the shaft 20 of the drum 21 in the casing ends. A ring 23 whose inner surface is concave in a section parallel to its axis, is inserted in the casing end around the shaft 20. The latter has a branching duct 24 therein through which the gaseous vehicle may be blown on to the inside of the ring 23 to protect the bearings 22 from the material. FIGURE 7 also shows another device for protecting the bearings 22 of the shaft 20. The ring 23a has inner and outer concave surfaces and has passages (not shown) therethrough so that the gas can be passed through the ducts 25 and on to the shaft to protect the bearings from the ingress of material.

Figure 8:
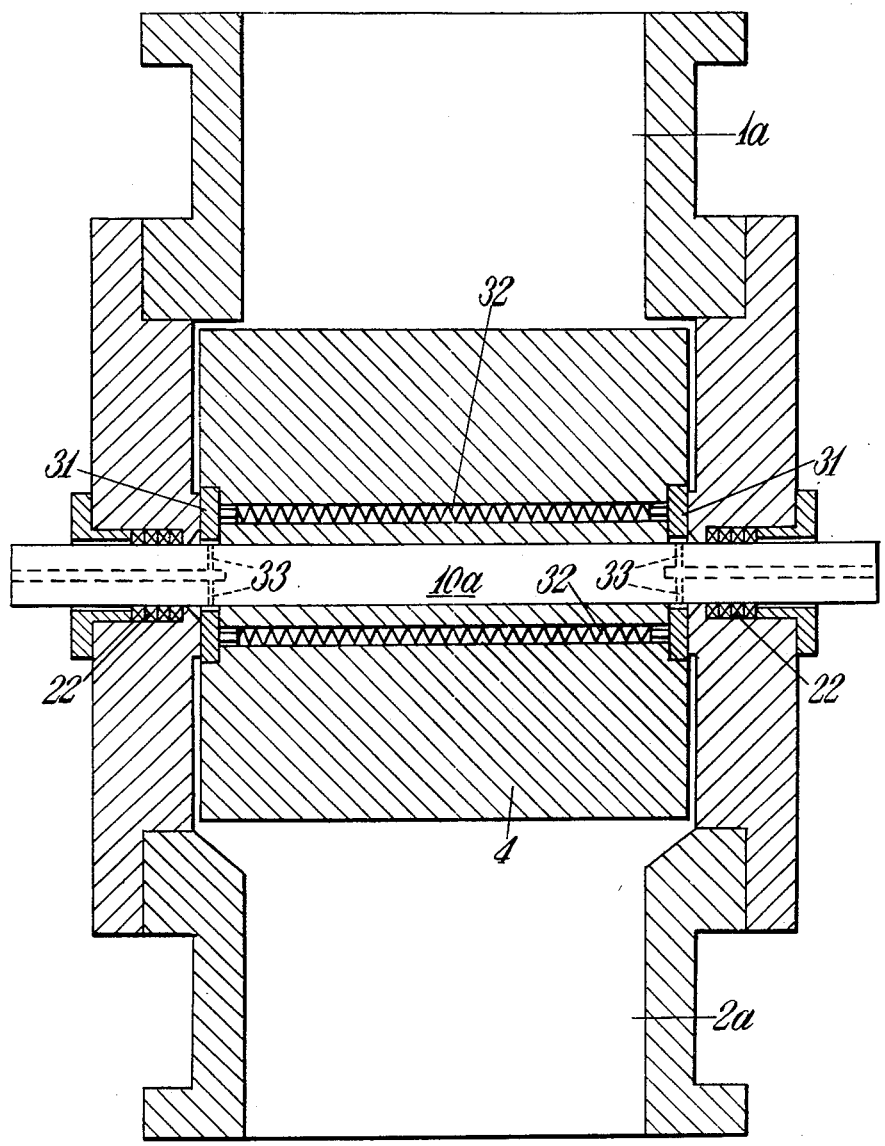

FIGURE 8 shows another method according to the invention of protecting the bearings of the drum shaft against the material. Graphite rings 31 are provided held against the ends of the casing by the springs 32. Additionally, a gaseous vehicle could be blown on to the inner surface of the rings 31 by means of branching ducts 34 as shown by the dotted lines in the shaft 33.

I claim:
1. A device for placing materials in suspension in a gaseous vehicle, in the form of powders or granules, to be injected into or onto a metallic melt, comprising a container for storing the materials, a main duct for conveying the gaseous vehicle, an outlet passage leading from the container, and a metering device having a variable speed rotor between the outlet passage and the main duct, the rotor of the metering device being a cylindrical drum whose axis of rotation is perpendicular to an axis of the outlet passage and whose co-axial surface is provided with pockets to entrain the materials to be injected, the inside of the storage container and the inside of the metering device being subjected to a pressure at least equal to that at the point where the materials are passed into the main duct, the storage container being pressurized by means of a tube leading into its upper portion from the main duct, the drum being in a cylindrical casing in which a gap between the radial faces of the drum and the adjacent faces of the casing is for most of its area equivalent to at least 2 mm. at each end of the drum, and bosses are provided projecting from the casing ends and surrounding the shaft of the drum, so that the gaseous vehicle can be passed through at least one duct at each end into the gaps to remove material in the form of powder.

2. A device according to claim 1, in which the container is lined at least partly by a lining consisting of perforated plates through which the gaseous vehicle can be passed inwards.

3. A device according to claim 1, in which a lining is provided in the storage container and in which means are provided to vibrate the lining.

4. A device according to claim 1, in which a motor and a variable speed gear are provided to drive the metering device through the variable speed gear.

5. A device according to claim 1, in which a throttle valve is provided in the main duct and the inside of the storage container is subjected to a pressure equal to that at a position in the main duct upstream from the position where the material in the form of powder to be injected enters and downstream from the throttle valve in the main duct to cause a controllable loss in pressure.

6. A device according to claim 1, in which perforated plates are provided as linings in the connection between the metering device and the duct conveying the material in the form of powder to be injected.

7. A device according to claim 1, in which a valve is provided to control the flow of material in the form of powder from the metering device to the main duct.

8. A device according to claim 1, in which the gap is a few tenths of a millimeter not only in a central region corresponding to the boss but also over a larger area of the casing end.

9. A device according to claim 1, in which bearings are provided for the rotor, and in which a device is provided for blowing the gaseous mixture onto a shaft for the rotor.

10. A device according to claim 1, in which rings of graphite are provided pressed against bosses around the shafts of the drum.

11. A device according to claim 1, in which a constriction is provided in the duct for conveying the suspension of the material in the form of powder in the gaseous vehicle and downstream from the position where the material in the form of powder enters, and in which a duct is provided connecting the top of the container with the duct conveying the gaseous vehicle, the effective aperture of the constriction being not greater than the effective aperture of the duct.

References Cited in the file of this patent

UNITED STATES PATENTS

| | | |
|---|---|---|
| 1,271,107 | Weller | July 2, 1918 |
| 2,510,417 | Rehkalu | June 6, 1950 |
| 2,766,911 | Greaves et al. | Oct. 16, 1956 |
| 2,779,510 | Wilson | Jan. 29, 1957 |
| 2,805,147 | Schreiber | Sept. 3, 1957 |
| 2,858,212 | Durant et al. | Oct. 28, 1958 |
| 2,891,782 | Blackman et al. | June 23, 1959 |
| 2,907,499 | Agronin | Oct. 6, 1959 |

FOREIGN PATENTS

| | | |
|---|---|---|
| 514,253 | Great Britain | Nov. 3, 1939 |